United States Patent [19]
Tsujido et al.

[11] Patent Number: 5,274,574
[45] Date of Patent: Dec. 28, 1993

[54] DYNAMIC SIMULATION SYSTEM

[75] Inventors: Yoshinori Tsujido; Eriko Tayaoka, both of Hyogo, Japan

[73] Assignee: Mitsubishi Denk K.K., Tokyo, Japan

[21] Appl. No.: 656,318

[22] Filed: Feb. 19, 1991

[30] Foreign Application Priority Data

Feb. 19, 1990 [JP] Japan .................................. 2-37663

[51] Int. Cl.$^5$ ................................................. G06F 7/06
[52] U.S. Cl. ........................... 364/551.02; 364/474.01;
364/474.15; 364/474.21; 364/474.24
[58] Field of Search .................... 364/551.02, 185, 188,
364/192, 474.01, 474.15, 474.21, 474.24

[56] References Cited

U.S. PATENT DOCUMENTS

| | | | |
|---|---|---|---|
| 4,827,395 | 5/1989 | Anders et al. | 364/551.02 |
| 4,956,787 | 9/1990 | Ito et al. | 364/474.24 |
| 5,095,439 | 3/1992 | Seki et al. | 364/474.24 |

FOREIGN PATENT DOCUMENTS 59-144423 9/1984 Japan .

Primary Examiner—Jack B. Harvey
Assistant Examiner—Ellis B. Ramirez
Attorney, Agent, or Firm—Sughrue, Mion, Zinn, Macpeak & Seas

[57] ABSTRACT

A dynamic simulation system in which an internal model is dynamically changed according to input data. The status of variation of the internal model is inputted, and the display and/or sound output of the internal model is dynamically changed according to the status of variation thus inputted. In the dynamic simulation, not only the state of a model is displayed, but also the status of variation of the model is outputted as display data or sound data. Accordingly, the operator can readily recognize the amounts of variation calculated during simulation.

7 Claims, 2 Drawing Sheets

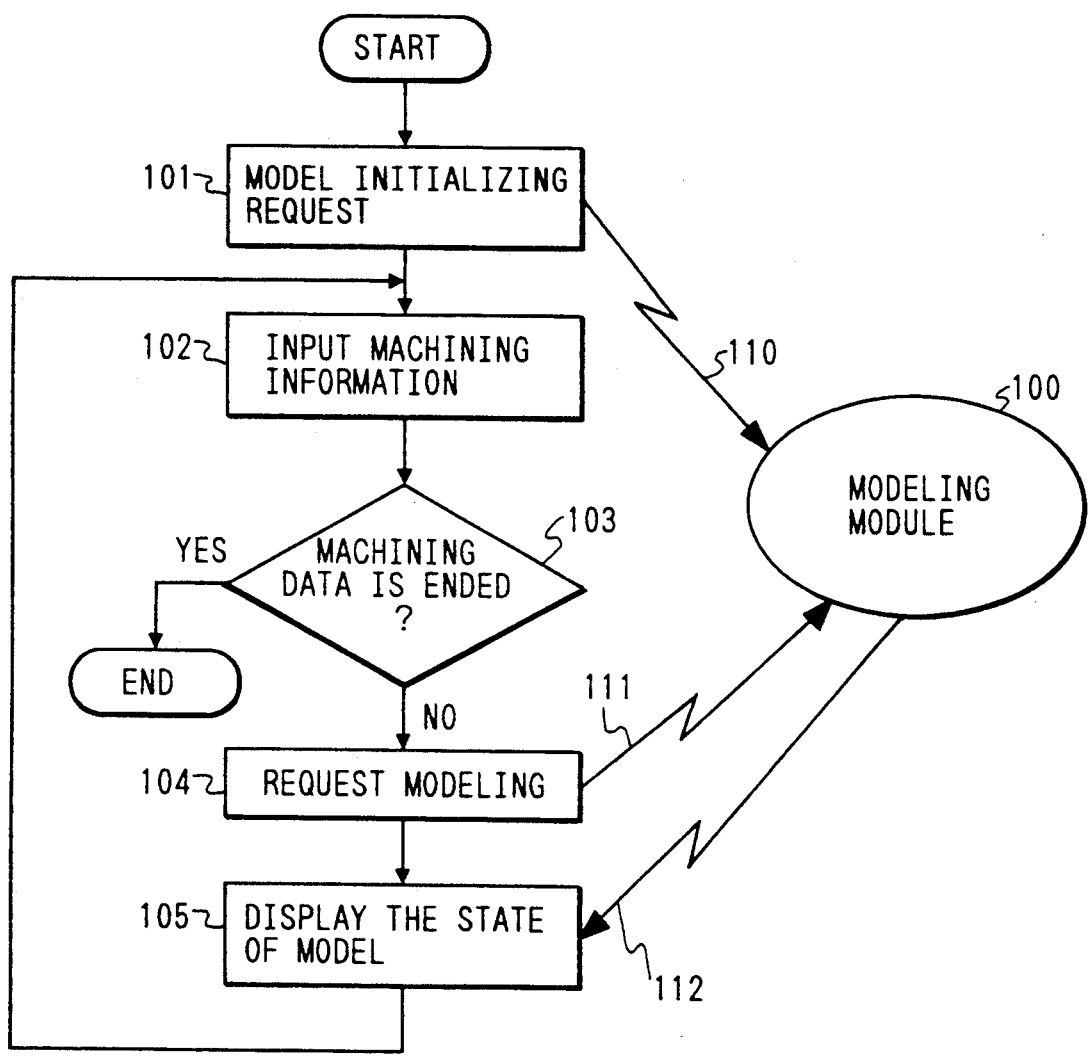

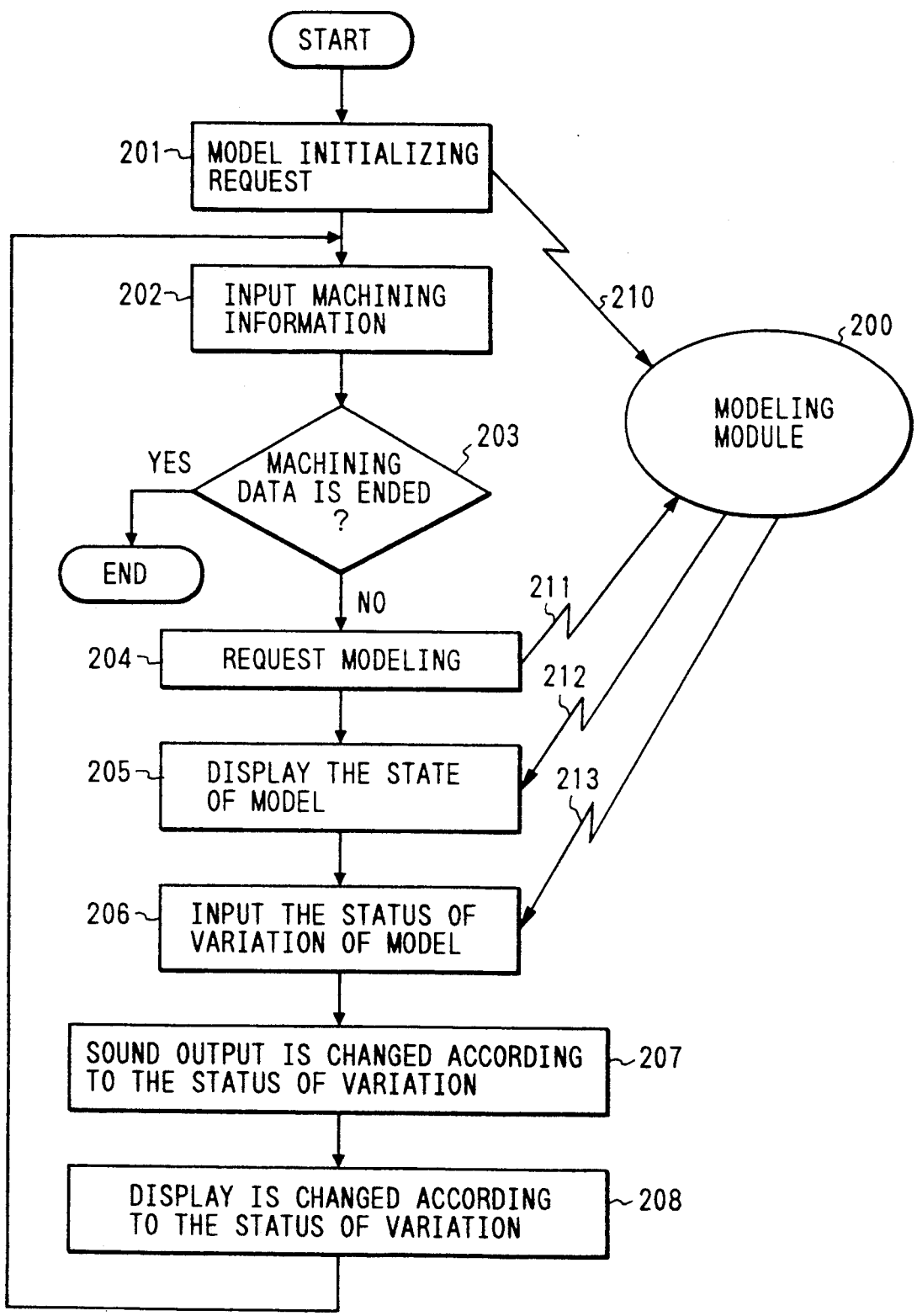

DYNAMIC SIMULATION SYSTEM

BACKGROUND OF THE INVENTION

This invention relates to a dynamic simulation system for informing an operator of the variations of a cubic (three-dimensional) model or two-dimensional pattern model by simulation which is expressed on a computer in the field of CAD (computer aided design) or CAM (computer aided manufacturing) so that he can understand them with ease.

A dynamic simulation technique has been well known in the art. In the field of mechanical machining, machining (cutting) simulation display is generally employed for the CNC (computerized numerical control) of a lathe. As for machining simulation with a machining center or the like, its realizing method has been disclosed by the publication "REAL-TIME SHADED NC MILLING DISPLAY" (TIM VAN HOOK: COMPUTER GRAPHICS Volume 20, Number 4, August 1986, a publication of ACM SIGGRAPH) for instance.

A conventional dynamic simulation system will be described with reference to FIG. 1, a flow chart.

In FIG. 1, reference numeral 100 designates a modeling module for performing the control and change of a model in a computer.

In Step 101, a model initializing request 110 is applied to the modeling module 100. In response to the model initializing request 110, the model is initialized which is under the control of the modeling module 100.

In Step 102, machining data are inputted. The term "inputted machining data" as used herein is intended to mean data such as extremely small amounts of movement which are continuously outputted, for instance, by an NC machining automatic programming unit or machine control unit.

In step 103, it is determined whether or not the input of machining data has is ended. When it is determined that the input of machining data has ended the processing is ended; whereas when it is determined that the input of machining data has not ended, the following Step 104 is activated.

In Step 104, a modeling request 111 is applied to the modeling module 100 according to the machining data provided in the above step. In response to the modeling request 111, the modeling module 100 performs a changing operation such as deformation of the model.

In Step 105, reference (102) is made to the model changed in the above-described step, to display the state of the model.

The dynamic simulation is realized by repeatedly carrying out the above-described operations in Steps 101 through 105 at high speed.

However, the conventional dynamic simulation system is disadvantageous in the following points: That is, in the conventional dynamic simulation system, only the model's machining states are displayed, and therefore it is difficult for the operator to confirm the data on the variations of the model, which lowers the workability.

In other words, in simulation, various processing operations are carried out according to a model in the computer, and the variations of the model can be detected relatively readily; however, the data on the variations are not effectively utilized.

SUMMARY OF THE INVENTION

Accordingly, an object of this invention is to eliminate the above-described difficulties accompanying a conventional simulation system. More specifically, an object of the invention is to provide a simulation system in which, in simulation, the operator can recognize calculated variations with ease, and which can be used readily and contributes to improvement of the workability.

Provided according to the invention is a dynamic simulation system in which an internal model is dynamically changed according to input data, in which, according to the invention, the status of variation of the internal model is inputted, and the display and/or sound output of the internal model is dynamically changed according to the status of variation thus inputted, when outputted.

Further provided according to the invention is a dynamic simulation system in an NC machining operation in which machining model data are internally provided, and a machining model is changed according to the machining model data, in which, according to the invention, data on a cutting volume per unitary time and a cutting direction are inputted, and the display and/or sound output of the machining model is dynamically changed according to the data thus inputted, when outputted.

In the dynamic simulation system of the invention, the display and/or sound output is utilized to inform the operator of the variations of the model in NC machining simulation or the like.

BRIEF DESCRIPTION OF THE DRAWINGS

In the accompanying drawings:

FIG. 1 is also a flow chart for a description of a conventional dynamic simulation system; and FIG. 2 is a flow chart for a description of a dynamic simulation system according to this invention.

DESCRIPTION OF THE PREFERRED EMBODIMENT

An embodiment of the present invention will be described with reference to FIG. 2.

In FIG. 2, reference numeral 200 designates a modeling module adapted to perform the control and change of a model in a computer.

In Step 201, a model initializing request 210 is applied to the modeling module 200. In response to the model initializing request 210, the model is initialized which is under the control of the modeling module 200.

In step 202, machining data are inputted. The term "inputted machining data" as used herein is intended to mean data such as extremely small amounts of movement which are continuously outputted, for instance, by an NC machining automatic programming unit or machine control unit.

In step 203, it is determined whether or not the input of machining data has ended. When it is determined that the input of machining data has ended the processing is ended; whereas when it is determined that the input of machining data has not ended, the following Step 204 is activated.

In Step 204, a modeling request 211 is applied to the modeling module 200 according to the machining data provided in the above step. In response to the modeling request 211, the modeling module performs a changing operation such as deformation of the model.

In Step 205, reference (202) is made to the model changed in the above-described step, to display the state of the model.

In Step 206, the modeling module 200 inputs (as indicated at 213) the status of variation (amount of variation) of the internal model. For instance in an NC machining dynamic simulation, a cutting volume per unitary time, the direction of cutting, etc. are inputted.

In Step 207, a sound output is changed according to the status of variation (amount of variation) inputted in the Step 206. For instance in the case where the cutting volume per unitary time is large or cutting is carried out in the direction in which the cutting load is large, an artificial cutting sound loud and low in frequency is outputted so as to inform the operator of the fact that the tool load is heavy; whereas in the case where the cutting volume per unitary time is small or cutting is in the direction in which the cutting load is small, an artificial cutting sound low in volume and high in frequency is formed to inform the operator of the fact that the tool load is light.

In Step 8, in accordance with the status of variation (amount of variation) inputted in Step 206, the display is changed—for instance the tool's color is changed. More specifically in the case where the cutting volume per unitary time is large, or cutting is in the direction in which the cutting load is large, the tool is displayed in a color high in saturation to inform the operator of the fact that the tool load is high; whereas in the case where the cutting volume per unitary time is small, or cutting is in the direction in which the cutting load is small, the tool is displayed in a color low in saturation, to inform the operator of the fact that the tool load is low.

After Step 208, Step 202 is activated again.

Steps 207 and 208 can be selectively carried out depending on operation modes. That is, control is so made that for instance in a sound-less mode, Step 207 is omitted, and in a display-change-less mode Step 208 is omitted.

The dynamic simulation according to the invention is achieved by repeatedly performing the above-described operations of Steps 201 through 208.

The dynamic simulation system in which the artificial cutting sound is produced according to the cutting value and the cutting direction has been described. The system may be simplified as follows: That is, instead of the cutting volume, only the presence or absence of cutting is detected, so that the outputting of a predetermined artificial machining sound is controlled (on-off controlled). The system is smaller in the quantity of information obtained through simulation; however, it is still effective in detecting the occurrence of an idle cutting operation (the part to be cut being not cut) or unexpected cutting operation. These functions can be applied to an NC machine. In this case, with the NC machine only, simulation can be performed with ease. Thus, an NC machine high in operability can be provided according to the invention.

As was described above, in the dynamic simulation system of the invention, in dynamic simulation, not only the state of a model is displayed, but also the status of variation of the model is outputted as display data or sound data. Hence, the operator can readily recognize the amounts of variation calculated during simulation. Thus, the simulation system of the invention can be used with ease, thus contributing to improvement of the workability.

What is claimed is:

1. A dynamic simulation system for simulating machining of a workpiece, the system comprising:
   an input device for sequentially inputting machining data corresponding to the machining of the workpiece;
   a modeling module for sequentially generating a simulated model of the workpiece in respective states responsive to the machining data input by said input device;
   a display device for displaying the simulated model generated by said modeling module;
   a variation detector for detecting the variation of the model generated by said modeling module with respect to the sequential input of machining data; and
   an output device for outputting an indication of the variation detected by said variation detector.

2. The dynamic simulation system of claim 11, wherein said output device is a sound generator that generated distinct sounds corresponding to respective variations detected by said variation detector.

3. The dynamic simulation system of claim 1, wherein said output device is a display screen that generates distinct images corresponding to respective variations detected by said variation detector.

4. The dynamic simulation system of claim 1, wherein the machining data represents numerical control (NC) data used in NC machining a workpiece; and
   wherein said variation detector detects variation in the cutting volume per unit time of the workpiece during the simulated machining operation.

5. A method of dynamically simulating machining of a workpiece, the method comprising the steps of:
   (a) sequentially inputting machining data corresponding to the machining of the workpiece;
   (b) sequentially generating a simulated model of the workpiece in respective states responsive to the machining data input in step (a);
   (c) displaying the simulated model generated in step (b);
   (d) detecting the variation of the model generated by said modeling module with respect to the sequential input of machining data; and
   (e) outputting an indication of the variation detected by said variation detector.

6. The method of dynamically simulating as recited in claim 5, wherein said outputting step (e) comprises the steps of:
   (e1) generating sounds respectively corresponding to variations detected in step (d); and
   (e2) displaying on a display screen images respectively corresponding to variations detected in step (d).

7. The method of dynamically simulating as recited in claim 5, wherein the variation detected in step (d) is the presence or absence of cutting during a simulated machining operation.

* * * * *

UNITED STATES PATENT AND TRADEMARK OFFICE
CERTIFICATE OF CORRECTION

PATENT NO. : 5,274,574
DATED : December 28, 1993
INVENTOR(S) : Yoshinori Tsujido et al It is certified that error(s) appears in the above-identified patent and that said Letters Patent is hereby corrected as shown below:

Column 4, Claim 2, line 1, delete "claim 11" and insert --claim 1--.

Signed and Sealed this

Eighteenth Day of April, 1995

Attest:

BRUCE LEHMAN

*Commissioner of Patents and Trademarks*

*Attesting Officer*